United States Patent
Cai et al.

(10) Patent No.: US 8,902,481 B2
(45) Date of Patent: Dec. 2, 2014

(54) METHOD AND APPARATUS FOR DOCUMENT DIGITIZATION

(71) Applicants: Lite-On Electronics (Guangzhou) Limited, Guangzhou (CN); Lite-On Technology Corp., Taipei (TW)

(72) Inventors: Yi Cai, Taipei (TW); Qi Ning, Taipei (TW); Chih-Po Lin, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/047,139

(22) Filed: Oct. 7, 2013

(65) Prior Publication Data
US 2014/0104663 A1    Apr. 17, 2014

(30) Foreign Application Priority Data
Oct. 16, 2012    (CN) .......................... 2012 1 0400785

(51) Int. Cl.
H04N 1/04    (2006.01)
H04N 1/00    (2006.01)

(52) U.S. Cl.
CPC ............................... *H04N 1/00761* (2013.01)
USPC ............ 358/509; 358/475; 358/474; 358/498

(58) Field of Classification Search
USPC .......................... 358/509, 475, 474, 498, 497
See application file for complete search history.

(56) References Cited

U.S. PATENT DOCUMENTS

| | | | |
|---|---|---|---|
| 6,785,405 B2 * | 8/2004 | Tuttle et al. | 382/112 |
| 7,244,043 B2 * | 7/2007 | Monk et al. | 362/239 |
| 2011/0220717 A1 * | 9/2011 | Jones et al. | 235/380 |

* cited by examiner

*Primary Examiner* — Houshang Safaipour
(74) *Attorney, Agent, or Firm* — Rosenberg, Klein & Lee

(57) ABSTRACT

In a method for document digitization, an apparatus generates a first image of a document sheet by irradiating the document sheet using a first light source and detecting the document sheet irradiated with light from the first light source, which enables detection of ink on the document sheet that defines a marked portion. The apparatus further generates a second image of the document sheet by irradiating the document sheet using a second light source and detecting the document sheet irradiated with light from the second light source, which enables detection of content on the document sheet. The apparatus further obtains a region of the second image that corresponds to the marked portion of the document sheet based on the first image.

22 Claims, 10 Drawing Sheets

METHOD AND APPARATUS FOR DOCUMENT DIGITIZATION

CROSS-REFERENCE TO RELATED APPLICATION

This application claims priority of Chinese Application No. 201210400785.2, filed on Oct. 16, 2012.

BACKGROUND OF THE INVENTION

1. Field of the Invention

The invention relates to a method and an apparatus for performing digitization, more particularly to a method and an apparatus that are configured to perform digitization of a document.

2. Description of the Related Art

Conventionally, an image scanner is able to perform scanning to obtain an image of an object (e.g., a document sheet), and to convert the image into a digital image file. Such process is usually referred to as digitization. Typically, the image scanner may have the function to convert only a selected part of the image. For example, the image scanner may provide a preview interface which enables a user to manually select the parts of the image to be digitized.

However, in cases where only parts of the image that are already marked using, for example, marker pens, are desired to be converted, the user still needs to operate in the preview interface to select these marked parts of the image. In cases where a less advanced image scanner is involved, the user may be allowed to select only one part of the image on the preview interface at a time.

It is therefore desirable to provide a way to enable a scanning device to automatically identify at least one part of an image that is marked using conventional ink and to automatically process that part for obtaining contents thereof, in order to simplify the manual operations involved in the conventional image digitization procedure.

SUMMARY OF THE INVENTION

Therefore, the object of the present invention is to provide a method and an apparatus that are configured to automatically obtain a specific region of a document that is marked using ink during image digitization.

According to one aspect of the present invention, a method for document digitization comprises:

(a) generating a first image of a document sheet by irradiating the document sheet using a first light source and detecting the document sheet irradiated with light from the first light source using an image sensing unit, the document sheet having a marked portion that is marked with ink, the light from the first light source enabling detection of the ink on the document sheet by the image sensing unit;

(b) generating a second image of the document sheet by irradiating the document sheet using a second light source and detecting the document sheet irradiated with light from the second light source using the image sensing unit, the light from the second light source having wavelength characteristics that differ from those of the light from the first light source, the light from the second light source enabling detection of content on the document sheet by the image sensing unit; and (c) obtaining, using an image processing unit, a region of the second image that corresponds to the marked portion of the document sheet based on the first image.

According to another aspect of the present invention, an apparatus for document digitization comprises a first light source, a second light source, an image sensing unit, and an image processing unit.

The first and second light sources are configured for emitting light. The light from the second light source has wavelength characteristics that differ from those of the light from the first light source.

The image processing unit is coupled to the first and second light sources, and the image sensing unit.

The image processing unit is operative to:

generate a first image of a document sheet by controlling the first light source to irradiate the document sheet and controlling the image sensing unit to detect the document sheet irradiated with the light from the first light source, the document sheet having a marked portion that is marked with ink, the light from the first light source enabling detection of the ink on the document sheet by the image sensing unit;

generate a second image of the document sheet by controlling the second light source to irradiate the document sheet and controlling the image sensing unit to detect the document sheet irradiated with the light from the second light source, the light from the second light source enabling detection of content on the document sheet by the image sensing unit; and obtain a region of the second image that corresponds to the marked portion of the document sheet based on the first image.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
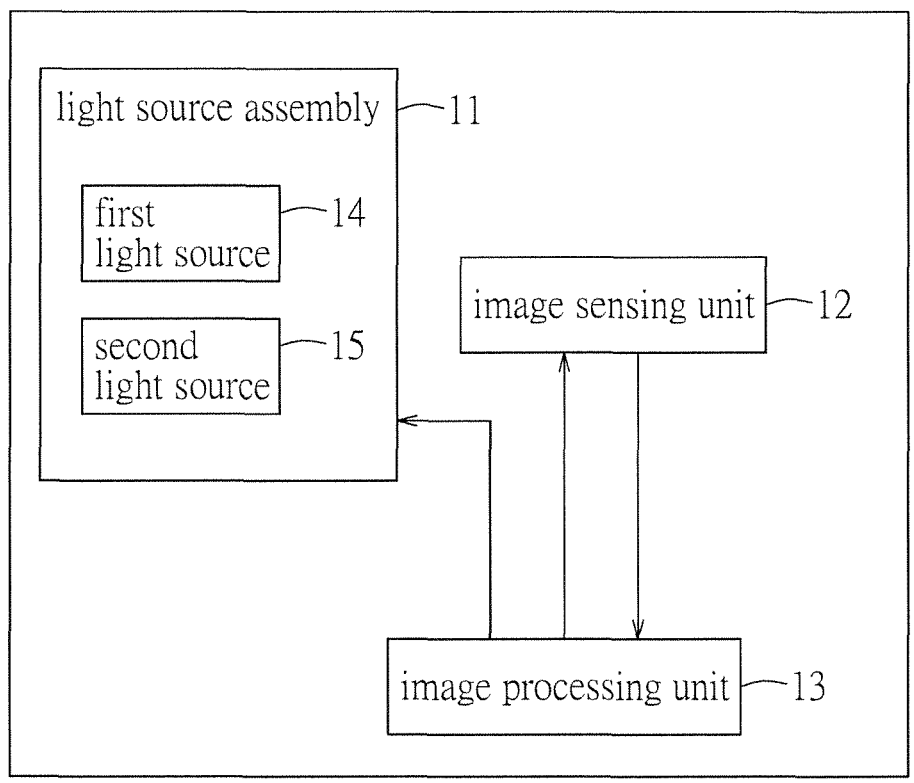
FIG. 1 is a circuit block diagram of a preferred embodiment of an apparatus for document digitization, according to the invention.

As shown in FIG. 1, the preferred embodiment of an apparatus for document digitization according to the present invention comprises alight source assembly 11, an image sensing unit 12, and an image processing unit 13.

The apparatus of this invention may be embodied as an electronic device configured to capture an image of a document sheet or a physical object, and to execute image digitization for obtaining a digital file of the captured image. For example, the apparatus may be one of an image scanner, a high speed camera and a digital camera (DC).

The image processing unit 13 is coupled to the light source assembly 11 and the image sensing unit 12 in order to control operations thereof.

The light source assembly 11 includes a first light source 14 and a second light source 15. In this embodiment, the first light source 14 is configured to emit light in ultraviolet spectrum, and the second light source 15 is configured to emit normal white light.

Figure 2:
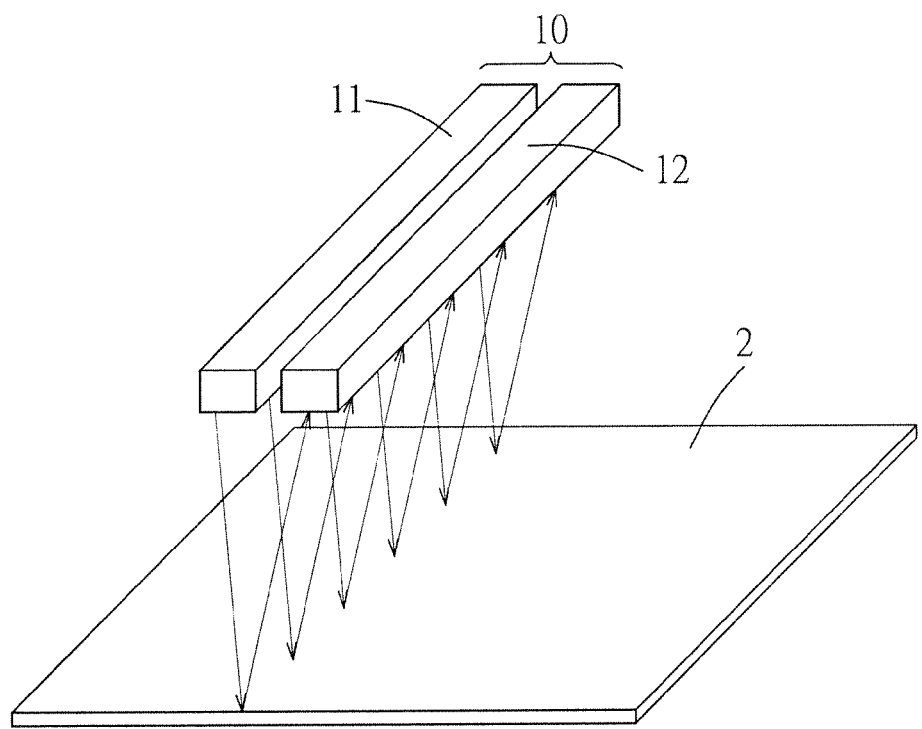
FIG. 2 is a schematic view of a movable contact image sensor (CIS) serving as a light source assembly and an image sensing unit for digitizing a document sheet, according to an embodiment of the present invention.

As shown in FIG. 2, in embodiments where the apparatus is embodied as an image scanner such as a flatbed scanner, the light source assembly 11 and the image sensing unit 12 may be embodied as a contact image sensor (CIS) 10 that is able to sweep over the document sheet or the physical object to be digitized.

Figure 3:
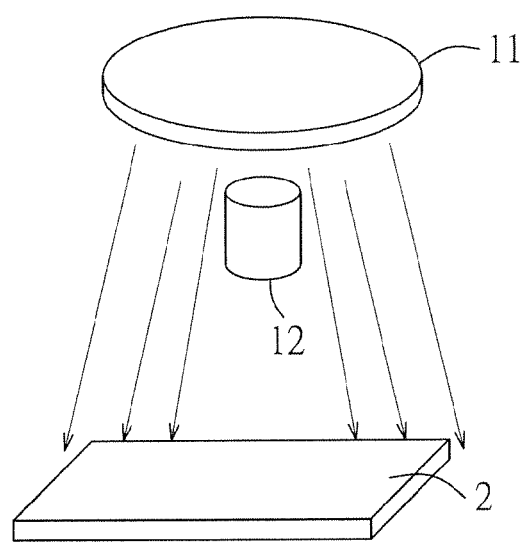
FIG. 3 is a schematic view of the light source assembly and the image sensing unit being placed directly above the document sheet, according to an embodiment of the present invention.

As shown in FIG. 3, in embodiments where the apparatus is embodied as a high speed camera or a DC, the light source assembly 11 and the image sensing unit 12 may be placed directly above the document sheet or the physical object.

In this embodiment, the apparatus is configured to perform image digitization for image captured from a document sheet, and further to "carve out" at least one marked portion that is marked with ink on the document sheet. Preferably, the apparatus is configured to identify kinds of ink that is reactive to irradiation of ultraviolet light, such as fluorescent ink.

Figure 4:
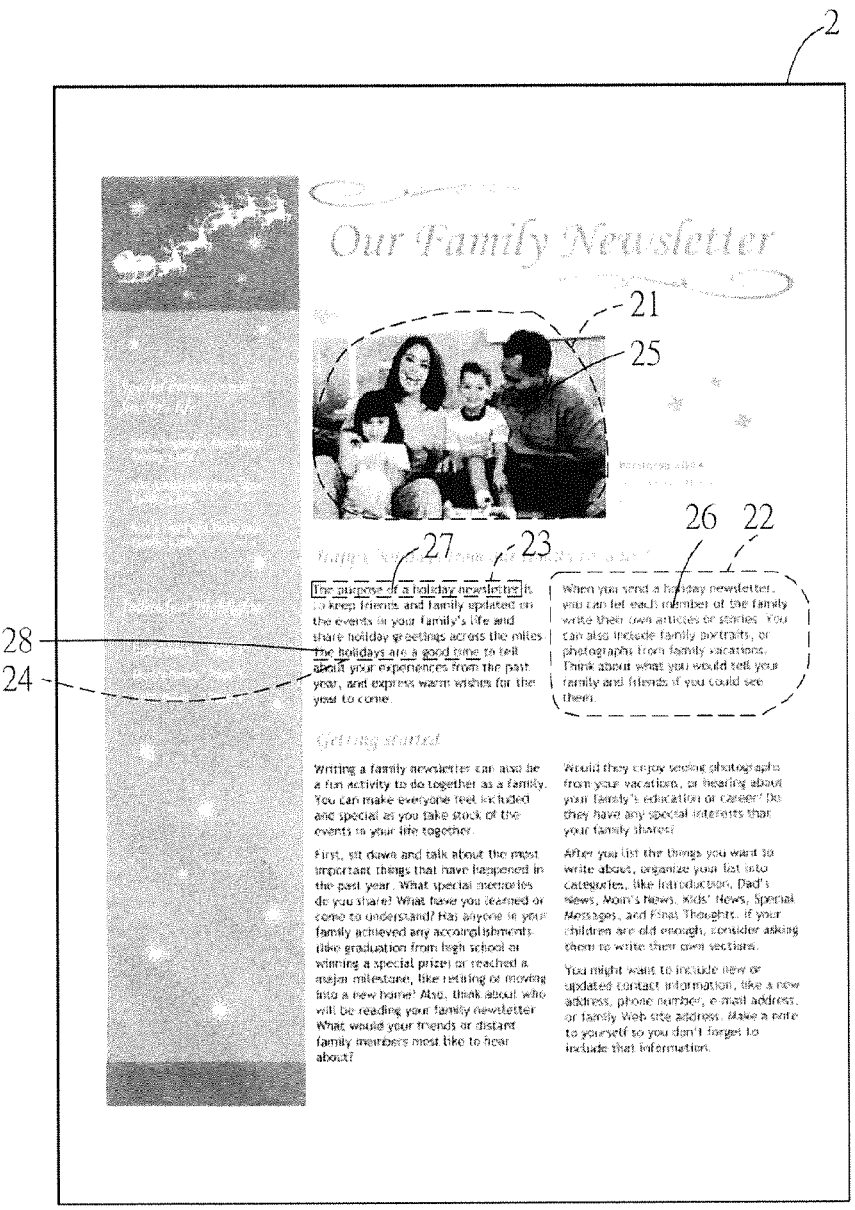
FIG. 4 illustrates a document sheet that is marked, using invisible fluorescent ink.

For example, referring to FIG. 4, a document sheet 2 has a plurality of marked portions 25 to 28 that are defined by respective ink marks 21 to 24 (shown in broken lines), using invisible fluorescent ink. Alternatively, in the example of FIG. 5, the marked portions 25 to 28 are defined by respective ink marks 21' to 24' (shown in solid lines), using visible fluorescent ink.

In other embodiments, the light source assembly 11 may include various light sources, as long as the light from the second light source 15 is configured to have wavelength characteristics that differ from those of the light from the first light source 14. In other words, with the configuration of the light source assembly 11, the apparatus may be able to identify non to fluorescent inks that have different reactions when exposed to the first and second light sources 14 and 15. Such ink may be one of a pencil core material, a chalk material, a marker ink, an oil-based ink, or the like.

Figure 6:
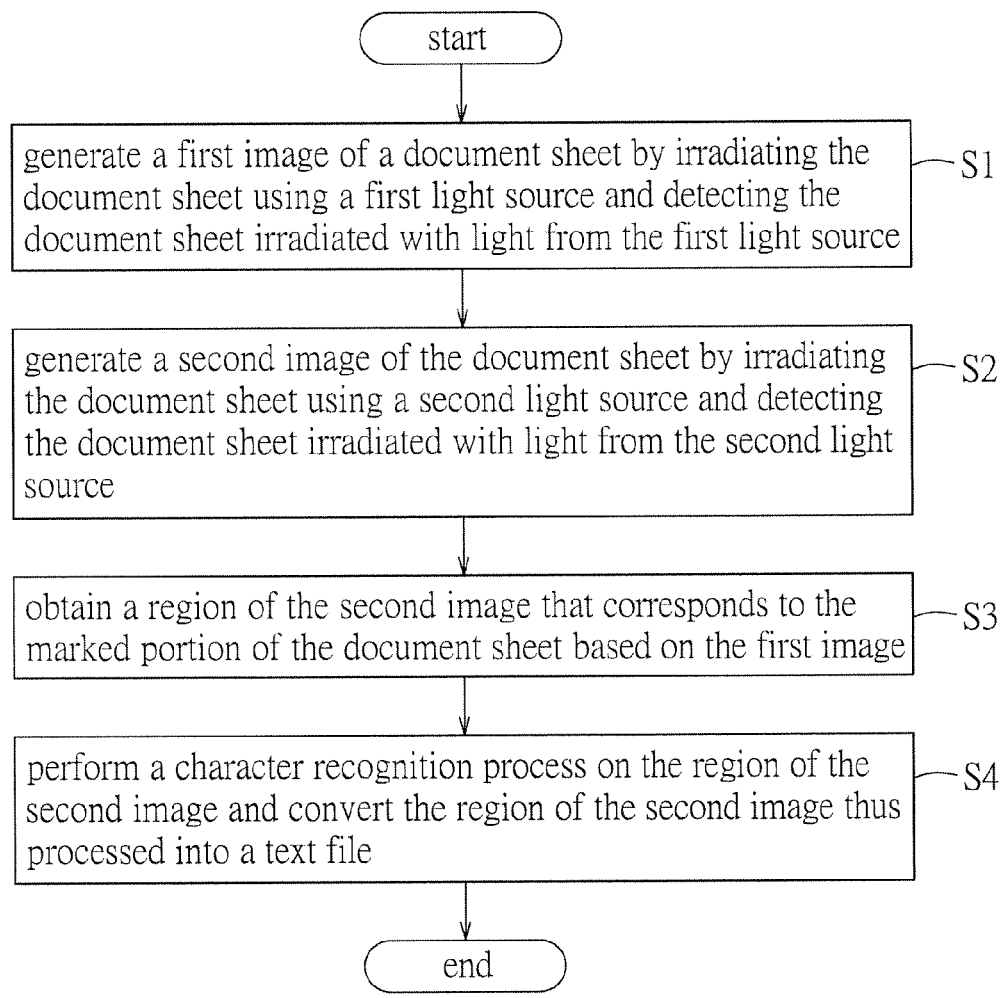
FIG. 6 is a flow chart of a method for document digitization implemented by the apparatus of FIG. 1, according to an embodiment of the present invention.

According to the preferred embodiment of the present invention, a method implemented by the apparatus for obtaining the at least one marked portion of the document sheet will now be described in detail with reference to FIG. 6. The method may be implemented as one specific function of the apparatus, and may be initiated when a user selects the specific function.

Figure 5:
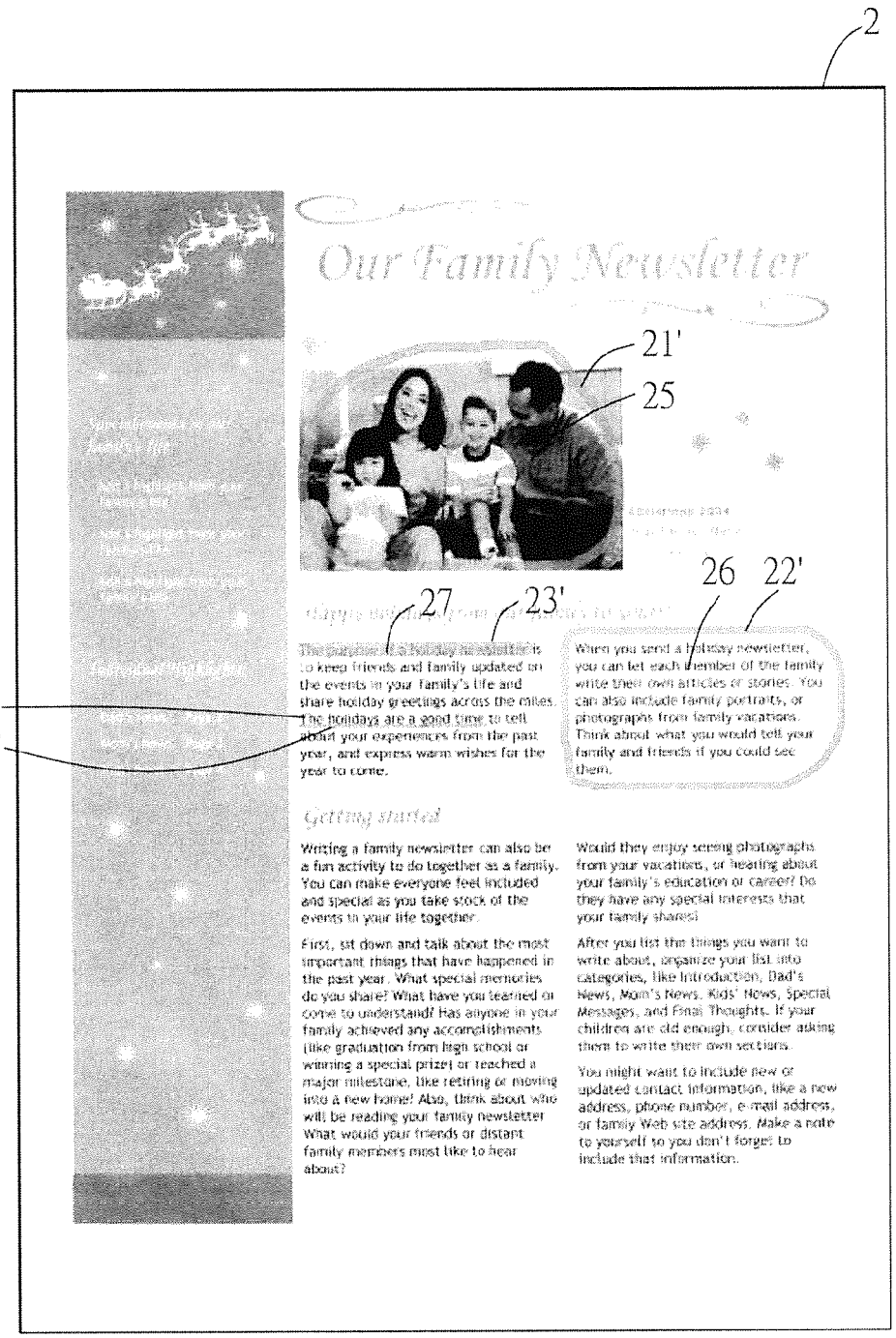
FIG. 5 illustrates a document sheet that is marked, using visible fluorescent ink.
Figure 7:
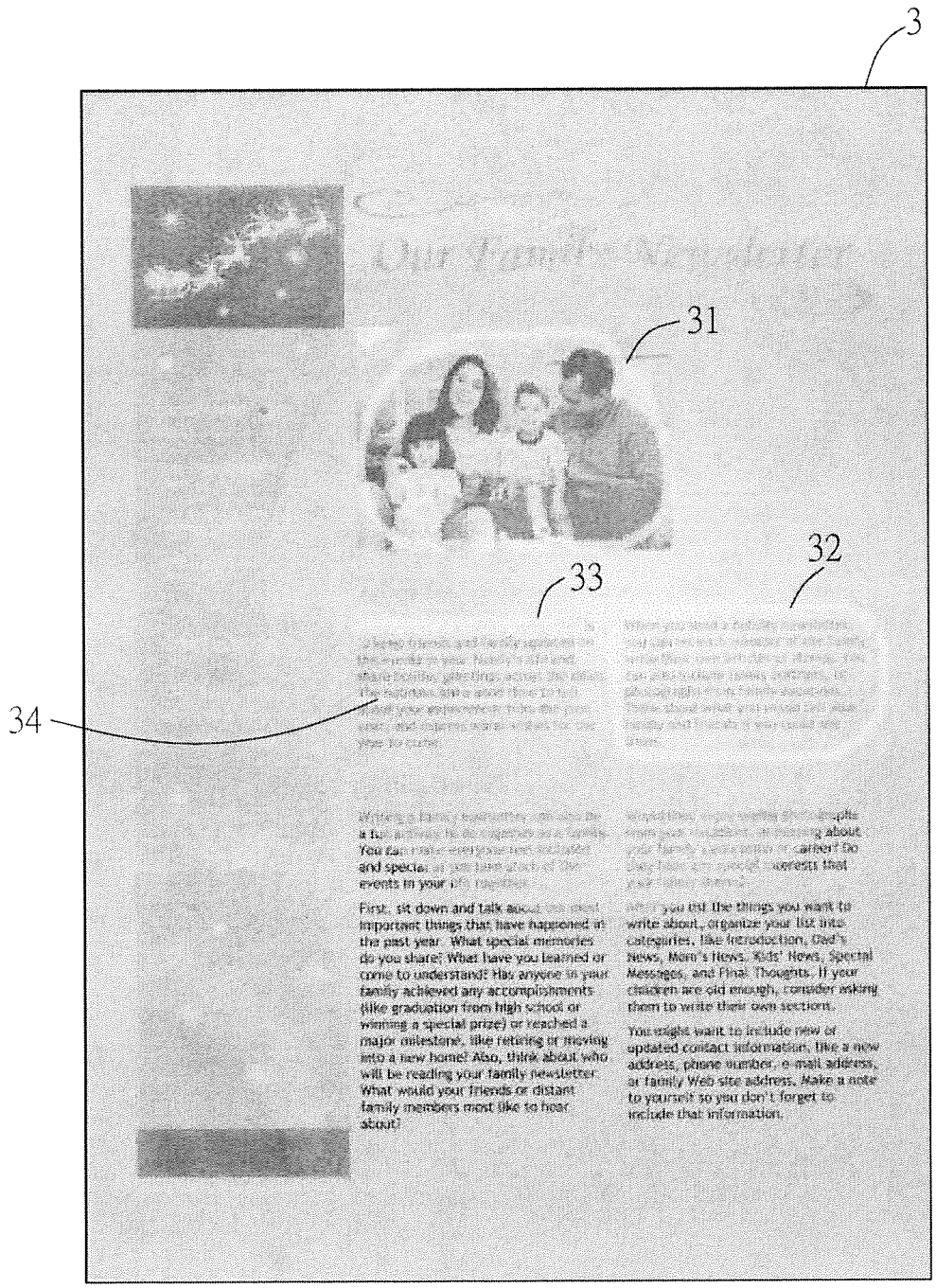
FIG. 7 illustrates a first image generated by the image sensing unit from the document sheet of FIG. 4 or 5, and including a plurality of first traces that result from ink excited by a first light source.

First, a document sheet 2 with marked portions 25 to 28 (as shown in FIG. 4 or 5) is provided to the apparatus. The image processing unit 13 then, in step S1, is operative to control the first light source 14 (i.e., ultraviolet light source) to irradiate the document sheet 2. The ink marks 21 to 24 or 21' to 24', when irradiated by the first light source 14, become excited, resulting in reactions that enable detection of the ink marks 21 to 24 or 21' to 24' by the image sensing unit 12. The image sensing unit 12 in turn generates a first image 3 by detecting the document sheet 2 irradiated with light from the first light source 14. The first image 3 contains information of the ink marks 21 to 24 or 21' to 24', as shown in FIG. 7.

Specifically, the ink marks 21 to 24, which are marked using invisible fluorescent ink, are reactive to irradiation of the first light source 14 to emit visible fluorescence, which can be detected by the image sensing unit 12. Therefore, a plurality of first traces 31 to 34 corresponding respectively to the ink marks 21 to 24 on the document sheet 2 are present in the first image 3. The first image 3 is then provided to the image processing unit 13 for subsequent processing.

Alternatively, the ink marks 21' to 24', which are marked using visible fluorescent ink, are also reactive to irradiation of the first light source 14, although in a different way. For example, at least one property of the light from the first light source 14 is converted by the ink marks 21' to 24' on the document sheet 2. As such, the first traces 31 to 34 corresponding respectively to the ink marks 21' to 24' on the document sheet 2 are present in the first image 3. In this embodiment, the at least one property may be brightness, hue, chroma, or the like.

Figure 8:
FIG. 8 illustrates a second image generated by the image sensing unit from the document sheet of FIG. 4.

While able to invoke a reaction from the ink marks 21 to 24 (and 21' to 24') for the image sensing unit 12, the light from the first light source 14 may not be sufficient to properly illuminate other contents of the document sheet 2. As such, the image processing unit 13 is operative in step S2 to control the second light source 15 (i.e., white light source) to irradiate the document sheet 2. The light from the second light source 15 enables detection of content on the document sheet 2 by the image sensing unit 12. The image sensing unit 12 in turn generates a second image 4 by detecting the document sheet 2 irradiated with light from the second light source 15. The second image 4 contains content of the document sheet 2 thus detected, as shown in FIG. 8. The second image 4 is then provided to the image processing unit 13 for subsequent processing.

Figure 9:
FIG. 9 illustrates a second image generated by the image sensing unit from the document sheet of FIG. 5, and including a plurality of second traces.

It should be noted that, in cases where the ink is visible fluorescent ink (FIG. 5), the ink marks 21' to 24' may also be reactive to the light of the second light source 15, thereby enabling detection by the image sensing unit 12. Therefore, a plurality of second traces 51 to 54 corresponding respectively to the ink on the document sheet 2 are present in the second image 5, as shown in FIG. 9.

Afterward, in step S3, the image processing unit 13 identifies a respective boundary for each of the first traces 31 to 34 on the first image 3 using, for example, edge detection. The image processing unit 13 further obtains regions of the second images 4 or 5 that correspond respectively of the marked portions 25 to 28 of the document sheet 2, based on the first traces 31 to 34 on the first image 3.

Figure 10:
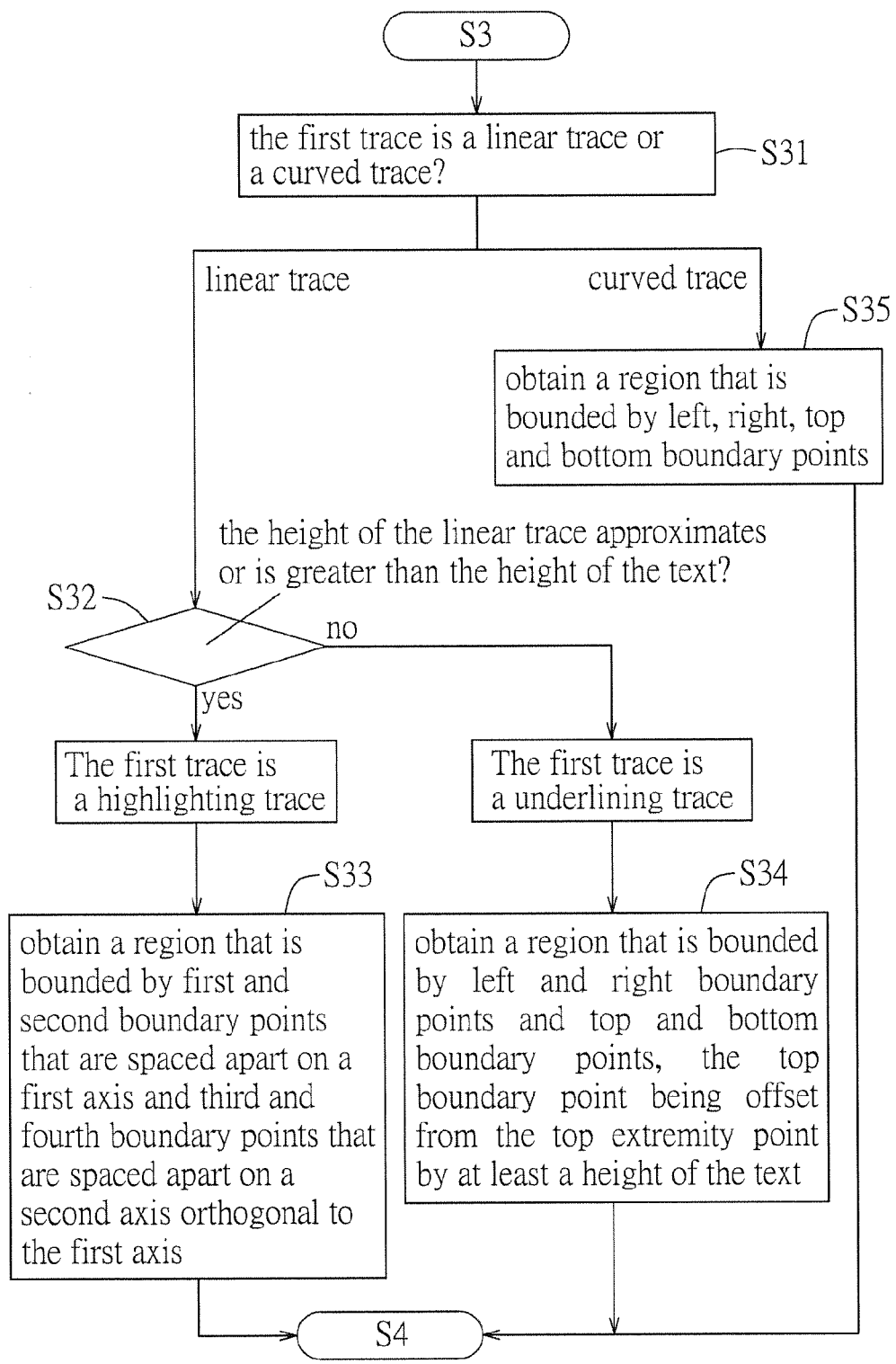
FIG. 10 is a flow chart of sub-steps performed by an image processor for determining a boundary for a region that is to be obtained for digitization.

The sub-steps performed by the image processing unit 13 in this step will be described in detail, with reference to FIG. 10.

In sub-step S31, the image processing unit 13 identifies whether each of the first traces 31 to 34 that correspond respectively to the ink marks 21 to 24 on the document sheet 2 and that are present in the first image 3 is a curved trace that defines a boundary of the corresponding marked portion, or a linear trace. Referring to FIG. 7, it can be seen that the first traces 31 and 32 are curved traces and the first traces 33 and 34 are linear traces.

In sub-step S32, the image processing unit 13 identifies whether each of the linear traces 33 and 34 is a highlighting trace that indicates text in the corresponding marked portion of the document sheet 2 by highlighting, or an underlining trace that indicates text in the corresponding marked portion of the document sheet 2 by underlining. This is done based upon a height of the linear trace and a height of the text indicated by the linear trace. Specifically, when the height of the linear trace approximates or is greater than the height of the text indicated by the linear trace, the image processing unit 13 identifies that the linear trace as a highlighting trace. Otherwise, the linear trace is identified as the underlining trace. In the example of FIG. 7, the first trace 33 is identified as the highlighting trace, while the first trace 34 is identified as the underlining trace.

The image processing unit 13 then attempts to determine a boundary for each of the marked portions 25 to 28 defined by a corresponding one of the first traces 31 to 34, and to obtain the regions of the second image 4 or 5 that correspond to the marked portions 25 to 28 of the document sheet 2.

In sub-step S35, for the first traces 31 and 32 that are curved traces, each of the regions of the second image 4 or 5 obtained by the image processing unit 13 is one that is bounded by left, right, top and bottom boundary points that correspond respectively to left, right, top and bottom extremity points of the corresponding curved trace in the first image 3.

Figure 11:
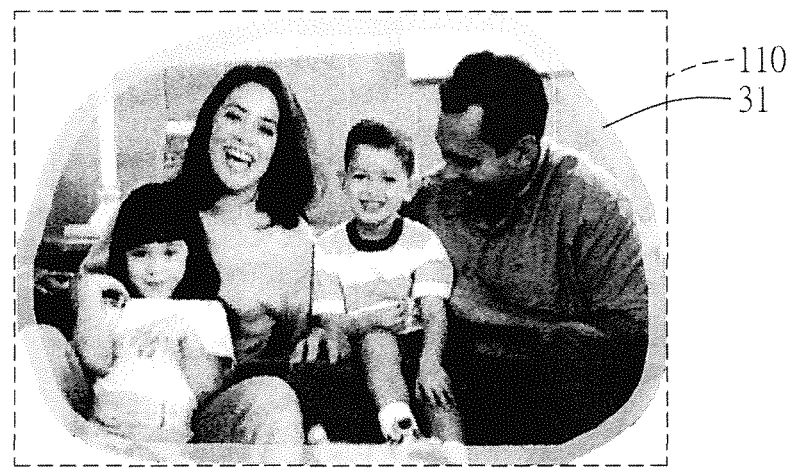
FIGS. 11 to 13 illustrate boundaries of the regions being determined based on the respective first traces.

In an example shown in FIG. 11, a region 110 (corresponding to the marked portion 25) of the second image 4 or 5 thus obtained is a rectangular region with the vertices defined by the left, right, top and bottom extremity points of the first trace 31. Other shapes of the region may be obtained by the image processing unit 13 in other embodiments.

Figure 12:
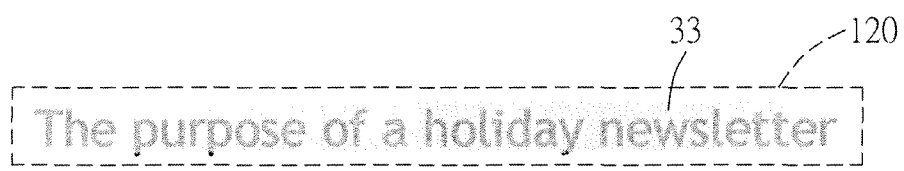

As for the first trace 33 (highlighting trace), a region 120 (corresponding to the marked portion 27) of the second image 4 or 5 obtained by the image processing unit 13 is one that is bounded by first and second boundary points that are spaced apart on a first axis and third and fourth boundary points that are spaced apart on a second axis orthogonal to the first axis (sub-step S33). Referring to FIG. 12, the first axis may be a horizontal axis while the second axis may be a vertical axis.

The first and second boundary points correspond respectively to first and second extremity points of the first trace 33 along the first axis in the first image 3. Each of the first and second boundary points has a respective offset relative to the respective one of the first and second extremity points in a direction away from the other one of the first and second boundary points. In this embodiment, the offset is set to be 0.5 millimeter.

Similarly, the third and fourth boundary points correspond respectively to third and fourth extremity points of the first trace 33 along the second axis in the first image 3, and each of the third and fourth boundary points has a respective offset relative to the respective one of the third and fourth extremity points in a direction away from the other one of the third and fourth boundary points. In the example shown in FIG. 12, the region 120 is a rectangular region with the vertices defined by the offset left, right, top and bottom extremity points of the first trace 33, and each edge of the rectangular region 120 has a 0.5 millimeter distance to the first trace 33.

As for the first trace 34 (underlining trace), a region 130 (corresponding to the marked portion 28) of the second image 4 or 5 obtained by the image processing unit 13 is one that is bounded by left and right boundary points and top and bottom boundary points (sub-step S34).

The left, right and bottom boundary points correspond respectively to left, right and bottom extremity points of the first trace 34 in the first image 3. Additionally, in order to properly cover the text indicated by the first trace 34, the top boundary point that corresponds to a top extremity point of the first trace 34 in the first image 3 is offset from the top extremity point by at least a height of the text.

The determination of the height of the text may be done using known techniques such as that disclosed in Chinese Patent Publication Number CN101571882A.

Figure 13:
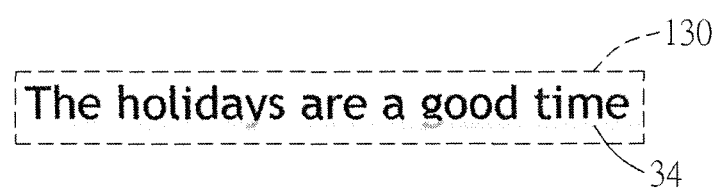

In the example shown in FIG. 13, the region 130 is a rectangular region with the vertices defined by the offset top extremity point and the left, right, and bottom extremity points of the first trace 34. In cases where the underlining trace is not adjacent to the text, the top boundary point may be offset by a larger distance.

Referring back to FIG. 6, after the regions are obtained, in step S4, the image processing unit 13 performs a character recognition process on the regions of the second image 4 or 5. For example, an optical character recognition (OCR) may be performed. The regions of the second image 4 or 5 thus processed are then converted into an editable text file. In other embodiments when it is not necessary to edit the texts, step S4 may be omitted. That is, the apparatus implementing the method may provide the user with an interface to choose whether to convert the regions into the editable text file.

In some embodiments where the second traces 51 to 54 are present, in determining the boundary of the regions, the image processing unit 13 may further take the second traces 51 to 54 into consideration. For example, the image processing unit 13 may cross-examine the respective pairs of the first traces 31 to 34 and the second traces 51 to 54, in order to obtain a more precise boundary of the regions.

In various embodiments, the first and second light sources 14 and 15 may be configured to emit light other than those described in the above embodiment, in order to accommodate other non fluorescent inks. The apparatus is applicable for implementing the method as long as the light from the first light source 14 can enable detection of the ink on the document sheet 2 by the image sensing unit 12, and the light from the second light source 15 can enable detection of content on the document sheet 2 by the image sensing unit 12.

In embodiments of the present invention, steps S1 and S2 may be executed in an arbitrary order without affecting the intended results.

To sum up, the method and apparatus of the present invention provide a means to automatically obtain multiple marked regions on an image of a document sheet, thereby reducing manual operations when performing document digitization.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A method for document digitization, comprising:
(a) generating a first image of a document sheet by irradiating the document sheet using a first light source and detecting the document sheet irradiated with light from the first light source using an image sensing unit, the document sheet having a marked portion that is marked with ink, the light from the first light source enabling detection of the ink on the document sheet by the image sensing unit, at least one property of the light from the first light source being converted by the ink on the document sheet such that a first trace corresponding to the ink on the document sheet is present in the first image;

(b) generating a second image of the document sheet by irradiating the document sheet using a second light source and detecting the document sheet irradiated with light from the second light source using the image sensing unit, the light from the second light source having wavelength characteristics that differ from those of the light from the first light source, the light from the second light source enabling detection of content on the document sheet by the image sensing unit, a second trace corresponding to the ink on the document sheet being present in the second image; and (c) obtaining, using an image processing unit, a region of the second image that corresponds to the marked portion of the document sheet based on the first image, the image processing unit being configured to obtain the region of the second image based on the first trace in the first image and the second trace in the second image.

2. The method of claim 1, the ink being invisible fluorescent ink, wherein:
in step (a), the light from the first light source is able to excite the ink on the document sheet to emit visible fluorescence such that a first trace corresponding to the ink on the document sheet is present in the first image.

3. The method of claim 1, the ink being visible fluorescent ink,
wherein the at least one property is selected from the group consisting of brightness, hue and chroma.

4. The method of claim 1, further comprising:
performing, by the image processing unit, a character recognition process on the region of the second image, followed by converting the region of the second image thus processed into a text file.

5. A method for document digitization, comprising:
(a) generating a first image of a document sheet by irradiating the document sheet using a first light source and detecting the document sheet irradiated with light from the first light source using an image sensing unit, the document sheet having a marked portion that is marked with ink, the light from the first light source enabling detection of the ink on the document sheet by the image sensing unit;

(b) generating a second image of the document sheet by irradiating the document sheet using a second light source and detecting the document sheet irradiated with light from the second light source using the image sensing unit, the light from the second light source having wavelength characteristics that differ from those of the light from the first light source, the light from the second light source enabling detection of content on the document sheet by the image sensing unit;

(c) obtaining, using an image processing unit, a region of the second image that corresponds to the marked portion of the document sheet based on the first image;

(c1) identifying, by the image processing unit, whether a trace that corresponds to the ink on the document sheet and that is present in the first image is a linear trace; and (c2) identifying, by the image processing unit, whether the linear trace is a highlighting trace that indicates text in the marked portion of the document sheet by highlighting, or an underlining trace that indicates text in the marked portion of the document sheet by underlining, based upon a height of the linear trace and a height of the text indicated by the linear trace.

6. The method of claim 5, wherein, in sub-step (c2), the linear trace is identified as a highlighting trace when the height of the linear trace approximates or is greater than the height of the text indicated by the linear trace, and is identified as the underlining trace when otherwise.

7. The method of claim 5, wherein, in step (c), when the linear trace is identified as a highlighting trace, the region of the second image obtained by the image processing unit is one that is bounded by first and second boundary points that are spaced apart on a first axis and third and fourth boundary points that are spaced apart on a second axis orthogonal to the first axis,
the first and second boundary points corresponding respectively to first and second extremity points of the linear trace along the first axis in the first image, each of the first and second boundary points having a respective offset relative to the respective one of the first and second extremity points in a direction away from the other one of the first and second boundary points,
the third and fourth boundary points corresponding respectively to third and fourth extremity points of the linear trace along the second axis in the first image, each of the third and fourth boundary points having a respective offset relative to the respective one of the third and fourth extremity points in a direction away from the other one of the third and fourth boundary points.

8. The method of claim 6, wherein, in step (c), when the linear trace is identified as an underlining trace, the region of the second image obtained by the image processing unit is one that is bounded by left and right boundary points and top and bottom boundary points,
the left, right and bottom boundary points corresponding respectively to left, right and bottom extremity points of the linear trace in the first image,
the top boundary point corresponding to a top extremity point of the linear trace in the first image and being offset from the top extremity point by at least the height of the text indicated by the linear trace.

9. The method of claim 1, wherein:
step (c) includes identifying, by the image processing unit, whether a trace that corresponds to the ink on the document sheet and that is present in the first image is a curved trace that defines a boundary of the marked portion in the first image; and
in step (c), when the trace is identified as a curved trace, the region of the second image obtained by the image processing unit is one that is bounded by left, right, top and bottom boundary points that correspond respectively to left, right, top and bottom extremity points of the curved trace in the first image.

10. The method of claim 1, wherein the ink is non-fluorescent ink.

11. The method of claim 1, wherein the ink is selected from the group consisting of pencil core material, chalk material, marker ink and oil-based ink.

12. An apparatus for document digitization, comprising:
first and second light sources for emitting light, the light from said second light source having wavelength characteristics that differ from those of the light from said first light source;
an image sensing unit; and
an image processing unit coupled to said first and second light sources and said image sensing unit,
wherein said image processing unit is operative to
generate a first image of a document sheet by controlling said first light source to irradiate the document sheet and controlling said image sensing unit to detect the document sheet irradiated with the light from said first light source, the document sheet having a marked portion that is marked with ink, the light from said first light source enabling detection of the ink on the document sheet by said image sensing unit, generate a second image of the document sheet by controlling said second light source to irradiate the document sheet and controlling said image sensing unit to detect the document sheet irradiated with the light from said second light source, the light from said second light source enabling detection of content on the document sheet by said image sensing unit, obtain a region of the second image that corresponds to the marked portion of the document sheet based on the first image, identify whether a trace that corresponds to the ink on the document sheet and that is present in the first image is a linear trace; and identify whether the linear trace is a highlighting trace that indicates text in the marked portion of the document sheet by highlighting, or an underlining trace that indicates text in the marked portion of the document sheet by underlining, based upon a height of the linear trace and a height of the text indicated by the linear trace.

13. The apparatus of claim 12, the ink being invisible fluorescent ink, wherein:
the light from said first light source is able to excite the ink on the document sheet to emit visible fluorescence such that a first trace corresponding to the ink on the document sheet is present in the first image.

14. The apparatus of claim 12, the ink being visible fluorescent ink, wherein:
at least one property of the light from said first light source is converted by the ink on the document sheet such that a first trace corresponding to the ink on the document sheet is present in the first image;
wherein the at least one property is selected from brightness, hue and chroma.

15. The apparatus of claim 14, wherein:
a second trace corresponding to the ink on the document sheet is present in the second image; and
said image processing unit is configured to obtain the region of the second image based on the first trace in the first image and the second trace in the second image.

16. The apparatus of claim 12, wherein said image processing unit is further configured to perform a character recognition process on the region of the second image, and to subsequently convert the region of the second image thus processed into a text file.

17. The apparatus of claim 12, wherein the linear trace is identified as a highlighting trace when the height of the linear trace approximates or is greater than the height of the text indicated by the linear trace, and is identified as the underlining trace when otherwise.

18. The apparatus of claim 12, wherein, when the linear trace is identified as a highlighting trace, the region of the second image obtained by said image processing unit is one that is bounded by first and second boundary points that are spaced apart on a first axis and third and fourth boundary points that are spaced apart on a second axis orthogonal to the first axis,
the first and second boundary points corresponding respectively to first and second extremity points of the linear trace along the first axis in the first image, each of the first and second boundary points having a respective offset relative to the respective one of the first and second extremity points in a direction away from the other one of the first and second boundary points,
the third and fourth boundary points corresponding respectively to third and fourth extremity points of the linear trace along the second axis in the first image, each of the third and fourth boundary points having a respective offset relative to the respective one of the third and fourth extremity points in a direction away from the other one of the third and fourth boundary points.

19. The apparatus of claim 12, wherein, when the linear trace is identified as an underlining trace, the region of the second image obtained by said image processing unit is one that is bounded by left and right boundary points and top and bottom boundary points,
the left, right and bottom boundary points corresponding respectively to left, right and bottom extremity points of the linear trace in the first image,
the top boundary point corresponding to a top extremity point of the linear trace in the first image and being offset from the top extremity point by at least the height of the text indicated by the linear trace.

20. The apparatus of claim 12, wherein:
said image processing unit is operative to identify whether a trace that corresponds to the ink on the document sheet and that is present in the first image is a curved trace that defines a boundary of the marked portion in the first image; and
when the trace is identified as a curved trace, the region of the second image obtained by said image processing unit is one that is bounded by left, right, top and bottom boundary points that correspond respectively to left, right, top and bottom extremity points of the curved trace in the first image.

21. The apparatus of claim 12, wherein the ink is non-fluorescent ink.

22. The apparatus of claim 12, wherein the ink is selected from the group consisting of pencil core material, chalk material, marker ink and oil-based ink.

* * * * *